United States Patent [19]
Hentsch

[11] 3,788,548
[45] Jan. 29, 1974

[54] CONTROL TEMPERATURE BLOW STICK FOR INJECTION MOLD APPARATUS

[75] Inventor: Helmut O. Hentsch, Chicago, Ill.

[73] Assignee: Continental Can Company, Inc., New York, N.Y.

[22] Filed: June 5, 1972

[21] Appl. No.: 259,893

[52] U.S. Cl. .................................... 239/132.3
[51] Int. Cl. .................................... B05b 15/00
[58] Field of Search ............................. 239/132.3

[56] References Cited
UNITED STATES PATENTS

| | | | |
|---|---|---|---|
| 3,112,072 | 11/1963 | Malone | 239/132.3 |
| 3,504,856 | 4/1970 | Hinkeldey, Jr. et al. | 239/132.3 |
| 3,638,932 | 2/1972 | Masella et al. | 239/132.3 |
| 3,642,060 | 2/1972 | Hlinka | 239/132.3 |

Primary Examiner—Lloyd L. King
Attorney, Agent, or Firm—Dorsey L. Baker et al.

[57] ABSTRACT

An improved blow stick for receiving and forming a thermoplastic parison within an injection mold and includes elongated core forming member having a bore therethrough. A second hollow member is carried within said bore and is provided with an exterior surface which mates with the surface of the bore to form cooling passages for the circulation of a cooling fluid. Additionally, sources of cooling fluids and expansion fluids are connected to said cooling passages and to said hollow member for respectively transferring heat from a parison formed on the core forming member and for subsequently expanding the parison against an expansion mold.

5 Claims, 7 Drawing Figures

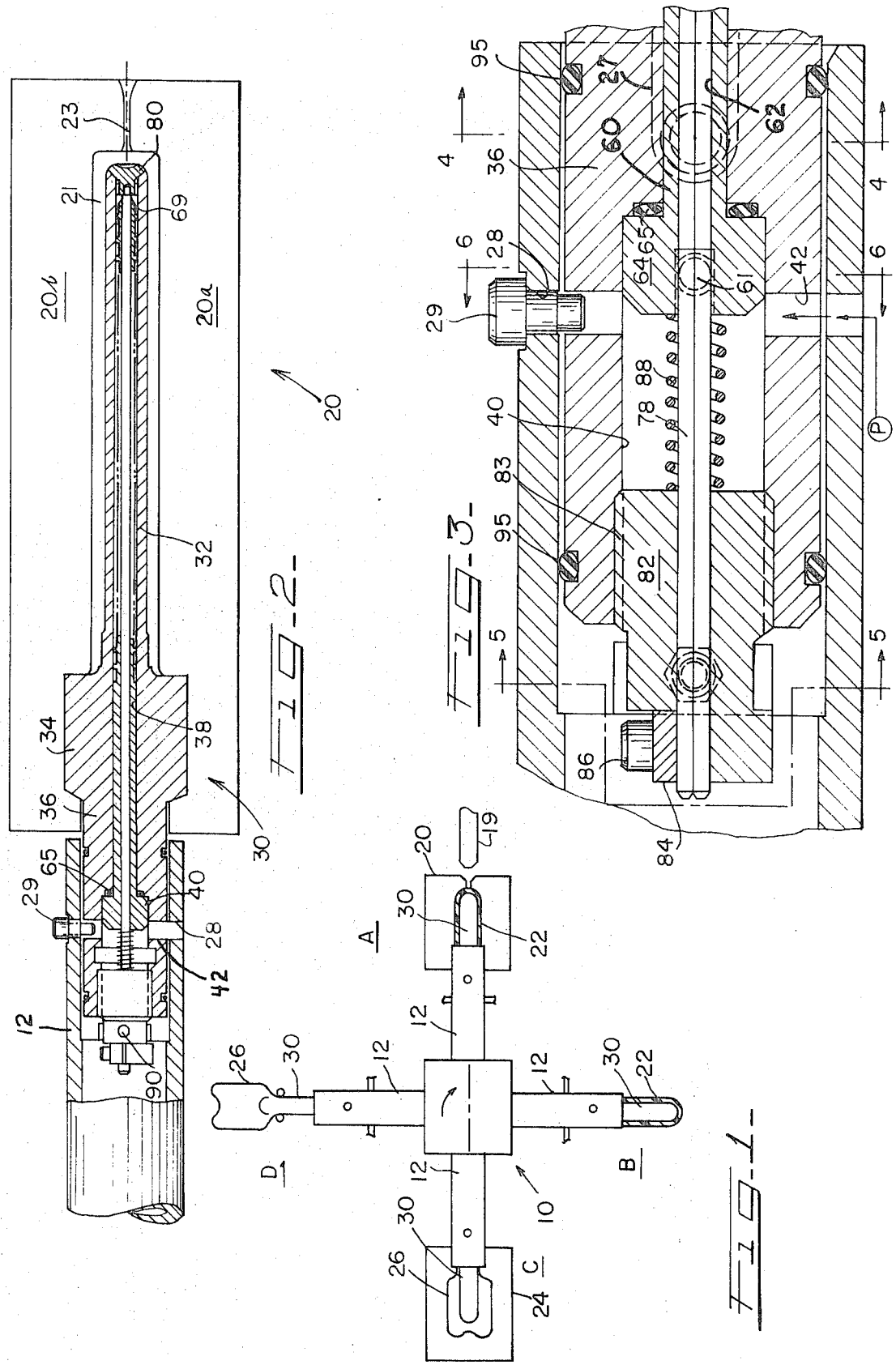

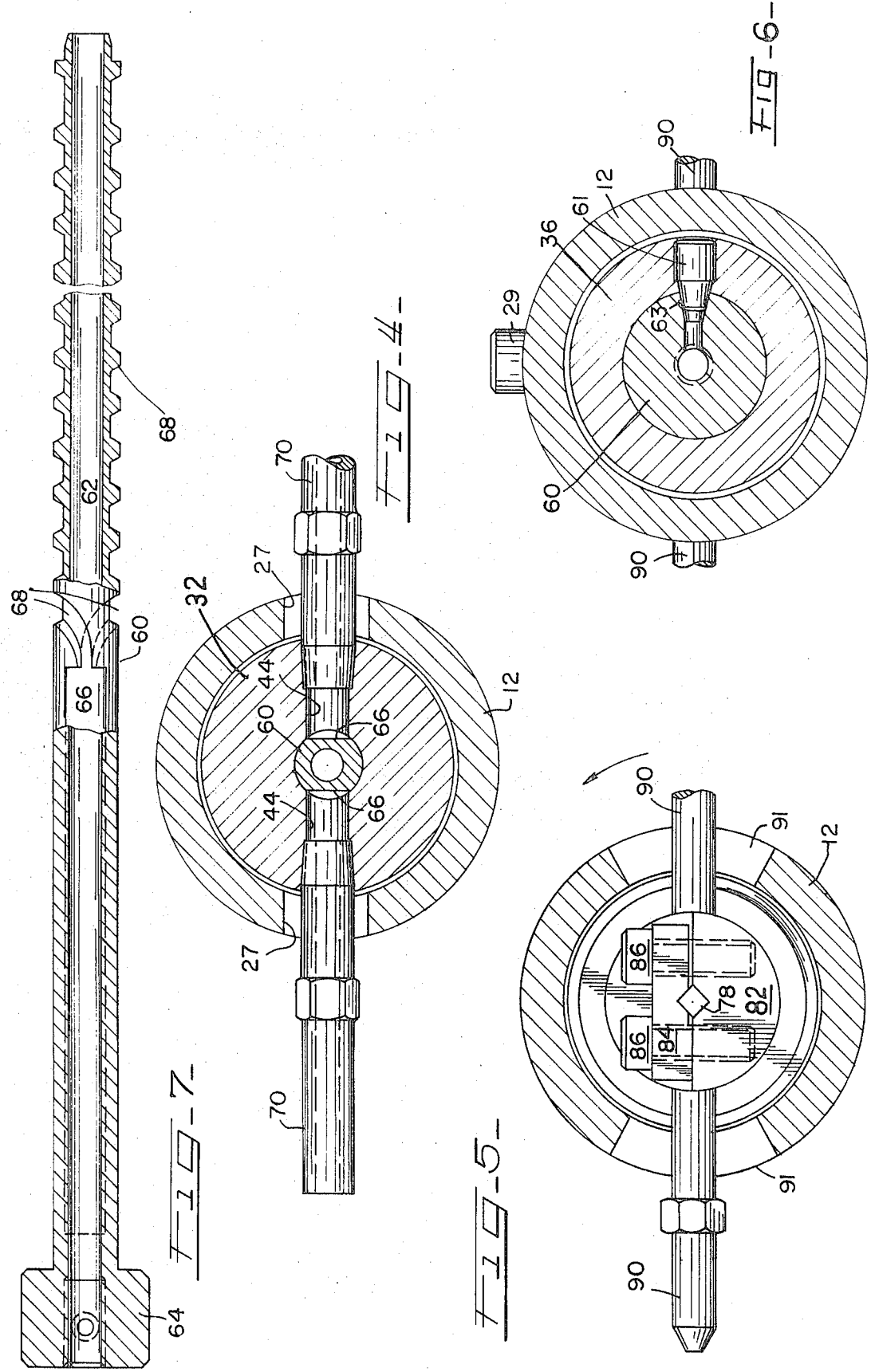

CONTROL TEMPERATURE BLOW STICK FOR INJECTION MOLD APPARATUS

BACKGROUND OF THE INVENTION

This invention relates to the field of injection blow molding. More specifically, it relates to a blow stick upon which a parison of thermoplastic is formed for utilization in an injection blow molding process such as that illustrated in U.S. Pat. Application, Ser. No. 201,823, filed Nov. 24, 1971 by Fred J. Zavasnik, and assigned to Continental Can Company, Inc. Essentially, this process teaches the formation of a termoplastic parison about a core forming member within an injection mold and subsequently cooling the surfaces of the parison adjacent the core forming member in the interior surfaces of the mold. After such cooling of the exposed walls of the parison are effected, the parison is transferred to a delay station whereby the heat from the interior portion of the parison may flow to these exposed surfaces and reheat the same, such heat tranfer resulting in a parison of a relatively uniform temperature near the material's glass transition temperature. Finally, the parison is transferred on the blow stick to a blow mold where it is expanded to form a finished article, preferably a container having a high degree of orientation.

In carrying out such a process difficulties have been encountered in developing a core forming member which is sufficiently long to carry a parison for a container such as a bottle and at the same time provide the sufficient rigidity for the blow stick.

SUMMARY OF THE INVENTION

In order to obtain a blow stick or core forming member which is adapted to practicing the above identified process, the blow stick of the instant invention includes an elongated core forming member having a bore therethrough. Within this bore is the hollow member having double threads thereon which cooperate with the surface of the bore to form a cooling passage for circulating fluids from the rear to the forward end of the blow stick and back out again. Finally, this hollow member provides a passage for the admission of a fluid utilized to expand the parison against the walls of a blow mold.

Accordingly, it is an object of the instant invention to provide an improved blow stick which meets the structural requirements necessary for an injection molding process, and will not be deflected by the injection of a hot thermoplastic material into the mold at substantial pressures. This avoidance of deflection will result in a parison of more uniform wall thickness. Additionally, it is an object of the invention to provide a blow stick having cooling passages therethrough whereby the exposed interior walls of the parison may be cooled rapidly to the glass transition temperature such that when expanded into a finished article the plastic material will be oriented. Finally, it is an object of the instant invention to provide a valve control means for controlling the admission of expansion fluids into the parison.

DESCRIPTION OF THE DRAWINGS

The manner in which the objects of this invention is obtained will be made clear by consideration of the following specification and claims when taken in conjunction with the drawings in which:

FIG. 1 is a plan view illustrating an environment in which the instant invention may be utillized;

FIG. 2 is a side elevational view of a preferred embodiment of the instant invention taken through the vertical center line thereof;

FIG. 3 is an enlarged side elevational view of a portion of the embodiment of FIG. 2;

FIG. 4 is a side elevational view taken through the lines 4—4 of FIG. 3;

FIG. 5 is a side elevational view of the instant invention taken through the lines 5—5 of FIG. 3;

FIG. 6 is a side elevational view in section taken through the lines 6—6 of FIG. 3; and FIG. 7 is a side elevational view partially in section of the cooling member of this embodiment.

DETAIL DESCRIPTION

The instant invention may be better illustrated by a review of the environment in which it is intended to be utilized. As depicted in FIG. 1, an injection molding apparatus and process is disclosed in which a turn table 10 carries four radial arms 12 having core forming members of blow sticks 30 thereon. By an appropriate apparatus, the turn table 10 and the blow sticks 30 may be rotated in clockwise direction from the injection mold 20 at station A through stations B, C, and D. As explained in the above identified Zavasnik application, this process and apparatus is intended to produce an oriented plastic container. Thus at station A, each blow stick 30 is placed within an injection mold 20 into which hot thermoplastic material is injected about the blow stick 30 from a nozzle 19 to form a parison 22. At station A cooling fluids (not shown) passing through the injection mold 20 and the blow stick 30 will cool the exposed interior and exterior surfaces of the parison 22 to a temperature at or below the glass transition temperature of the polymeric material. Subsequently, the mold 20 is opened, the turn table is raised out of the lower mold half in a conventional manner and rotated 90° to station B, a delay station at which the exterior and interior exposed walls of the parison are permitted to reheat through heat transfer from the interior of the parison. Such a reheating process results in a relatively equal temperature distribution throughout a cross section of the parison. Subsequently, the turn table 10 is raised and the parison 22 is then rotated to the blow mold 24 at station C where it is lowered into the lower mold half (not shown) with the upper mold half being closed thereon. At this point, air is admitted into the parison to expand the same against the interior walls 26 of the blow mold 24 to form the finished article. Then the turn table 10 is rotated to the station D where the formed article (a bottle in this case) is ejected from the blow stick 30.

The preferred embodiment of the instant invention has a most beneficial utilization with the environment just depicted with reference to FIG. 1 and includes a blow stick 30 having cooling passages extending therethrough as well as a means for admitting air into the parison.

As shown in FIG. 2, the preferred embodiment includes a hollow elongated member 32 which is provided with a hub and a rear extension 36 which is inserted into the hollow arm 12 carried by the turn table 10. As depicted in FIG. 2, the blow stick 30 has been lowered into the injection mold 20 formed by upper and lower mold halves 20a and 20b with the upper mold half 20b being closed thereon. The closing forces acting upon the upper and lower mold halves 20a and 20b are usually quite large and will cause these mold halves to rigidly hold the core 30 in proper alignment within cavity 21 through engagement with the hub 34. This proper alignment provides for the formation of a parison of uniform wall thickness on the blow stick 30 within the cavity upon injection of a termoplastic material through orifice 23 formed in the mold halves 20a and 20b.

Attaching the elongated core member 30 to the radial arm 12 is a set screw 29 which passes through the cross bore 28 within the radial arm 12 and and cross bore 42 within the rear extension 36 of the member 32. The extension 32 is provided with an elongated bore 38 and a counter bore 40 (see FIG. 3) within the rear extension 36.

Within the bore 38 is placed an elongated cooling member 60 (see FIG. 7) which also has a hollow bore 62 passing through the center thereof. At its rearward end, the cooling member 60 has an enlarged diameter 64 which abutts against the forward end of the counter bore 40 within the rear extension 36. As depicted in FIG. 6, the set screw 61 rigidly locks the cooling member 60 within the bore 38 of the elongated core forming member. Preferably a seal 65 is placed between the forward end of the counter bore 40 and the enlarged diameter 64 of the cooling member 60. The aperture 63 of the cooling member is located with respect to core member 32 such that the set screw 61 will urge the cooling member forwardly to compress the seal 65.

With reference to FIG. 7, it will be observed that the cooling member 60 is milled at 66 so as to provide two flat surfaces which are separated from the interior surface of the bore 38 so as to provide passages for cooling fluids. As best illustrated in FIGS. 2, 4 and 7, such cooling fluids enter the radial arm 12 through conduits 70 which are threadable connected with the elongated member 32. Subsequently, one of two passages 44 in the elongated member 32 directs the cooling fluids against one of the flat milled surfaces 66 which is connected with a double thread 68 of the cooling member 60. Thus cooling fluids entering from the right conduit 70 (for example) in FIG. 4 will be directed against the respective milled surface 66 and toward the forward end of the blow stick 30 between one of the double threads 68. At he forward end of the blow stick, the cooling fluid will be reversed in direction and travel back between the other thread 68 and is directed out along the milled surface 66 on the opposite side of the cooling member through the other passage 44 and back out the return conduit 70. Appropriately, a seal 69 is provided at the forward end of the blow stick to preclude loss of fluid. Thus it should be appreciated that the exterior diameter of the double threads 68, in conjunction with the interior surface of the bore 38 form a channel for the circulation of fluid within the blow stick 30 so as to provide heat transfer from the interior surface of the parison 22 formed thereon. Additionally, it should be appreciated that the very close tolerance or pressed fit between the thread 68 and the interior bore will serve to reinforce the blow stick 30, and to minimize any deflection thereof which may be caused by the injection of thermoplastic materials into the chamber 21, thus minimizing differences in the cross-sectional dimension of the parison thus formed.

Another function of the blow stick 30 is to direct air into the parison when it is placed within the expansion mold 24 at station C. Such is accomplished at the provision of a bore 62 which passes through the cooling member 60. Thus a source of air pressure P (FIG. 3) is connected to this bore 62 through bores 28 and 42 in the radial arm 12 and extension 36 opposite from the set screw 29. However, to control the flow of such air into the parison, a valve means or control member preferably in the form of a square rod 78 passes through the bore 62. Attached at the forward end of the control member is a frustonoconical valve member 80 which sealingly engages the otherwise open end of the core forming member 32. Accordingly, if the control rod 78 is urged forwardly, the valve member 80 is displaced from its seat and air may enter into the space between the parison 22 and the core member 32 to expand the parison against the blow mold 24, this effect taking place at station C of FIG. 1.

Such reciprocal movement of the control rod 78 may be effected by a valve actuating means carried by the rear extension 36 of the core member 32. Within the counter bore 40 is carried a collar 82 which has a threaded engagement 83 therewith. Thus if control rod 78 is constrained for rotation with the collar 82, rotation of this collar 82 will effect longitudinal motion of both the collar and the control rod to open and close the valve 80. The control rod 78 may be constrained for rotation with the collar 82 through the use of a "L" shaped bracket 84 which clamps the control rod 78 to the collar 82 through the use of two screws 86. Rotation of the collar 82 may be effected by two arms 90 which are threadably engaged with the collar 82 as illustrated in FIG. 5. These control rods 90 extend outwardly of the radial arm 12 through apertures 91. As previously mentioned, the turn table must not only rotate in a clockwise direction, but must also be raised and lowered in a vertical direction in order to clear and set within the bottom half of the injection and blow molds. This vertical movement may be used to effect rotation of the arms 90 and collar 82 if appropriate abutments are placed at stations A and C.

MODE OF OPERATION

As described with respect to FIG. 1, the four cores are carried by the turn table 10 in a clockwise manner. Additionally, the turn table and the cores must be vertically raised and lowered so as to be placed into and taken out of the lower mold halves of the injection and blow molds 20 and 24.

Throughout the operation, cooling fluid is delivered through the conduit 70, the double thread of the blow stick 68 and out the opposite conduit 70. In addition to this constant cooling effect, the air is directed from a source P through the cross drills 28 and 42 in the radial arms 12 and core member 32 and through the interior of the cooling member 60 about the four flat surfaces of the square rod 78. As the turn table and the core members 30 are raised and lowered, abutments appropriately placed on its support may effect rotation of the control arms 90 in a clockwise and counterclockwise direction so as to reciprocate the collar 82 and control rod 78 in the appropriate direction to effect opening and closing of the valve means 80 at the forward end of the control rod. Thus at station C and D the control rod 78 should be forward so as to admit air to parison and to help eject the bottle or formed container 26 from the blow stick. Additionally, seals 95 between the interior of the radial arm 12 and the rear extension 36 of the blow stick may serve to limit the lost of air, while a spring 88 interposed between the rear portion of the cooling member 60 and the annular collar 82 urge the control member 36 rearwardly so as to effect better sealing of the valve means 80.

Accordingly, a blow stick particularly adapted for utilization in an injection blow mold process which requires interior cooling of the parison has been described. As disclosed the cooling means takes the form of a hollow inner member having double threads thereon which for cooperating with the bore of the blow stick to form fluid circulating passages. Obviously such cooling passages might take other forms although the double threads are preferably in terms of manufacture, added rigidity, and flow capacity. Finally, concentric with and passing through the cooling member is a valve reciprocating means which takes the form of a valve at the forward end of the core member and the control rod which passes therethrough. This valve means which controls the admission of air into the parison might be placed at the rearward end of the blow stick and other modifications may be made.

I claim:

1. An article of manufacture comprising blow stick assembly means for use first in conjunction with an injection mold to form a parison thereon and then in conjunction with a blow mold for expanding such parison to a shape defined by the blow mold, said blow stick assembly means including an elongated core forming member having an axial bore therethrough, a hollow member extending through a major portion of said bore and seated therein, means sealing remote portions of said hollow member relative to said bore against the escape of fluid, at least a portion of said hollow member and said core forming member having cooperating surface configuration means defining cooling passages for the circulation of a cooling fluid in direct contact with said core forming member, means connected to said passages for circulating a cooling fluid therethrough, said hollow member defining an expansion fluid passage in communication with said bore at a free end of said core forming member beyond said hollow member, means connected to said hollow member for supplying an expansion fluid under pressure to said expansion fluid passage, and valve means at said core forming member free end for controlling the flow of expansion fluid from said core forming member and preventing the inflow of material molded around said core forming member.

2. The article of claim 1 wherein said cooperating surface configuration means includes that surface of said core forming member defining said bore and radially projecting elements on said hollow member.

3. The article of claim 2 wherein said radially projecting elements are of a thread-like configuration.

4. The article of claim 2 wherein said radially projecting elements are of a double thread-like configuration defining separate supply and return passages contacting said core forming member.

5. The article of claim 1 wherein said passages include two separate adjacent passages extending longitudinally of and around said hollow member, said passages being joined together adjacent said core forming member free end, and said two passages defining supply and return passages.

* * * * *